United States Patent [19]

Morin

[11] Patent Number: 4,660,846
[45] Date of Patent: Apr. 28, 1987

[54] SPRAY SHIELD FOR AUTOMOTIVE VEHICLES

[76] Inventor: Albert Z. Morin, Apt. 801, 2200 Regent St. South, Sudbury, Ontario, Canada, P3E 5S2

[21] Appl. No.: 799,344

[22] Filed: Nov. 18, 1985

[51] Int. Cl.⁴ .............................................. B62D 25/16
[52] U.S. Cl. ............................................. 280/154.5 R
[58] Field of Search .................... 280/154.5 R, 152 R, 280/154.5 A; 98/121.2

[56] References Cited

U.S. PATENT DOCUMENTS

| | | | |
|---|---|---|---|
| 1,904,343 | 4/1933 | Zaiger et al. | 280/154.5 R |
| 2,326,408 | 8/1943 | Strawsine | 98/121.2 X |
| 2,605,119 | 7/1952 | Earnest | 280/154.5 R |
| 2,782,053 | 2/1957 | Long | 280/154.5 R |
| 2,857,200 | 10/1958 | Hoppesch | 280/154.5 R |
| 3,350,114 | 10/1967 | Salisbury | 280/154.5 R |
| 4,382,606 | 5/1983 | Lightle et al. | 280/154.5 R |

FOREIGN PATENT DOCUMENTS

| | | |
|---|---|---|
| 360425 | 9/1936 | Canada . |
| 694985 | 9/1964 | Canada . |
| 1280695 | 10/1968 | Fed. Rep. of Germany ... 280/154.5 R |

*Primary Examiner*—John J. Love
*Assistant Examiner*—Michael Mar
*Attorney, Agent, or Firm*—Burke-Robertson, Chadwick & Ritchie

[57] ABSTRACT

A spray shield and system for controlling the spray generated by the wheels of automotive vehicles when travelling on a roadway surface. The shield is adapted to be disposed above the roadway surface vertically depending from the vehicle and spaced rearwardly from a vehicle wheel in a plane extending transversely to the vehicle. The shield is in sheet form and has front and rear surfaces and top and side borders. A plurality of downwardly depending, contiguous flaps extend, when the shield is in position on the vehicle, horizontally between the side borders, the flaps to permit flow of air and spray through the shield and cause downward deflection thereof. A pair of air deflection surfaces, to be vertically oriented during operation, one extending outwardly along each of the side borders and each angled with respect to the front surface of the spray shield are provided to deflect air and spray laterally, from one side of the shield to the other. The shield according to the present invention significantly reduces the hazard created by spray generated by a vehicle's tires by deflecting the spray downwardly and in a particular lateral direction, for example to the shoulder side of the vehicle.

9 Claims, 4 Drawing Figures

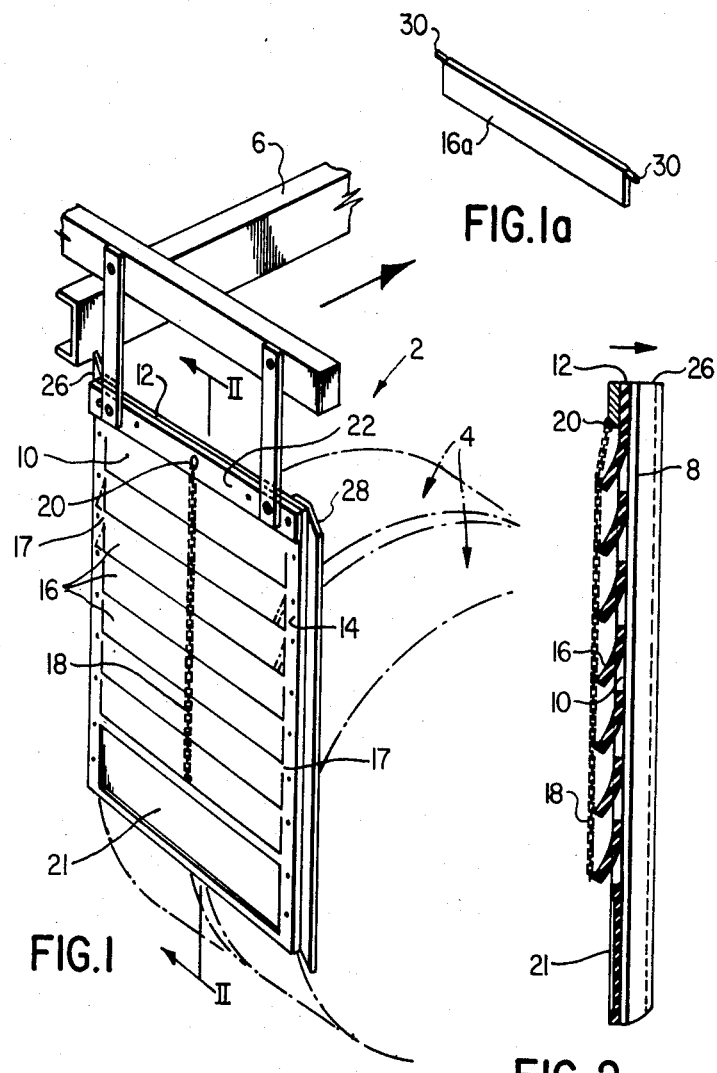
FIG.1a
FIG.1
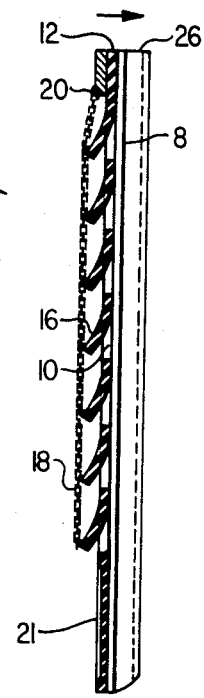
FIG. 2
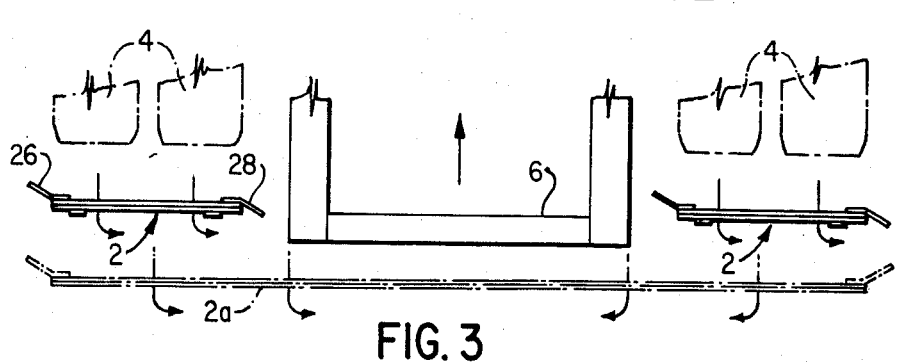
FIG. 3

SPRAY SHIELD FOR AUTOMOTIVE VEHICLES

FIELD OF THE INVENTION

The present invention relates to a spray shield and a system using a plurality of such spray shields, for controlling the spray generated by the wheels of automotive vehicles. It relates more particularly to a spray shield or splash guard that is adapted to be suspended in generally vertical orientation and disposed rearwardly of the vehicles' wheels to obstruct the spray of rain, dust, snow and rocks which may be thrown upwardly and rearwardly or laterally by the wheel. It also relates to a system incorporating one or a number of such spray shields to deflect the spray in a particular direction, for example underneath or towards one side of the vehicle.

BACKGROUND OF THE INVENTION

Particularly with heavy vehicles such as trucks, tractor trailers and buses, rain, snow, dust and rocks may be sprayed during movement, depending upon the type and condition of the roadway upon which such vehicle is travelling. Such spray may make it impossible to pass the vehicle safely or make it dangerous or hazardous to follow behind. When there is moisture on the roadway, this spray, at times, may be so intense as it is thrown on to the windshields of following vehicles that driving visibility may be reduced to a dangerous minimum. Similarly, since the spray is thrown laterally by the wheels of tractor trailers having multiple wheel systems, a similar problem is developed with respect to vehicles attempting to pass such tractor trailers. Because the wheels of such trucks are so large, water may be thrown laterally from the top of these wheels at the level of passenger car windshields, again producing a serious hazard to such a vehicle which attempts to pass a tractor trailer.

Such a problem has been previously recognized and many solutions proposed. For example U.S. Pat. Nos. 1,904,343, issued Apr. 18, 1933, to Zaiger, et al., and U.S. Pat. No. 4,382,606, issued May 10, 1983, to Lightle, et al., and Canadian Pat. No. 360,425, issued Sept. 8, 1936, to Cohen describe and illustrate different constructions of spray shields for automobiles consisting of solid sheets of varying surface contours. Such constructions, providing a solid wall against which the spray from the wheel is projected, tend to deflect the spray laterally. In the case of the Lightle, et al. device, the surface against which spray is projected is provided with a matrix of upstanding projections which would tend to collect mud and dirt and, in cold climates, snow and ice, thereby limiting its effectiveness. Long U.S. Pat. No. 2,782,053, issued Feb. 19, 1957 and Barry, et al. Canadian Pat. No. 694,985, issued Sept. 29, 1964, both describe and illustrate more complicated constructions of spray shields for vehicles, the shields being provided with louvers for permitting air and spray to pass through the shield but directing them downwardly as they pass through. The Long reference teaches a plurality of overlapping metal louvers, suspended downwardly at their ends, from spaced chains. In the Barry, et al. reference the louvers are fixed to the rear face of a screen panel. With such constructions made up of a number of mechanical parts, there is again a danger, in cold climates, that they will become frozen and/or clogged by snow and ice, thereby rendering them inoperative.

It is an object of the present invention to provide a spray shield which will deflect downwardly and to one side spray from the wheels of a vehicle. It is a further object of the present invention to provide such a device which will minimize air resistance against the forward surface of such a shield and which will be less prone to problems from cold driving conditions such as clogging or freezing. It is the further object of the present invention to provide such a spray shield which is relatively simple and economical to construct.

SUMMARY OF THE INVENTION

According to the present invention there is provided a spray shield for a wheel of an automotive vehicle for controlling the spray generated thereby when travelling on a roadway surface. It is adapted to be disposed above the roadway surface vertically depending from the vehicle and spaced rearwardly from a vehicle wheel in a plane extending transversely to the vehicle. The shield is in sheet form and has front and rear surfaces and top and side borders. A plurality of downwardly depending, contiguous flaps extend, when the shield is in position on the vehicle, horizontally between the side borders, the flaps to permit flow of air and spray through the shield and cause downward deflection thereof. A pair of air deflection surfaces, to be vertically oriented during operation, one extending outwardly along each of the side borders and each angled with respect to the front surface of the spray shield, are provided to deflect air and spray laterally, from one side of the shield to the other.

In a preferred embodiment of the present invention, a link means such as a rubberized chain joins each of the flaps and coqperates with a securing means associated with the shield to hold the flaps in a predetermined position. As well, the deflection surfaces are angled outwardly and forwardly on one side of the shield and outwardly and rearwardly on the other to provide a lateral deflection of air and spray from one side to the other of the shield. The spray shield according to the present invention can thus be used in a manner in which there is minimal air resistance to the shield, during operation, while at the same time spray of moisture, dust, snow, stones, etc., caused by the vehicle wheel are deflected downwardly and to one side (e.g. the roadway shoulder side) of a vehicle carrying spray shields according to the present invention.

BRIEF DESCRIPTION OF THE DRAWINGS

These and other objects and advantages of the invention will become apparent upon reading the following detailed description and upon referring to the drawings in which:

FIG. 1 is a partial, perspective view of a vehicle carrying a spray shield according to the present invention;

FIGURE 1a is a perspective view of a replacement flap for a spray shield according to the present invention;

FIG. 2 is a cross-sectional view along line II—II of FIG. 1; and

FIG. 3 is a partial, schematic, plan view of a wheel set of a vehicle carrying spray shields according to the present invention illustrating their manner of operation.

While the invention will be described in conjunction with example embodiments, it will be understood that it is not intended to limit the invention to such embodiments. On the contrary, it is intended to cover all alternatives, modifications and equivalents as may be included within the spirit and scope of the invention as defined by the appended claims.

DETAILED DESCRIPTION OF THE INVENTION

In the following description, similar features in the drawings have been given similar reference numerals.

Turning to FIG. 1 there is shown a perspective view of a spray shield 2 according to the present invention, suspended from the frame of vehicle 6 behind wheel 4. Shield 2 is in sheet form and is made up of front surface 8 and rear surface 10 as well as top border 12 and vertical side borders 14. Shield 2 is suspended above the roadway surface from vehicle 6, as illustrated, in vertical relationship to wheel 4 and spaced rearwardly therefrom in a plane extending transversely of the vehicle.

A plurality of downwardly depending, contiguous flaps 16 extend horizontally between the side borders 14. These flaps permit the flow of air and spray through the shield and cause downward deflection thereof. These flaps 16, as well as top border 12 and side borders 14 are made from a suitable sturdy, preferably flexible sheet material, for example rubber or plastic, and are preferably stamped from a single sheet for ease of construction. When thus constructed, flap 16 would pivot on uncut sections 17 extending between the flaps and side borders 14. A link means such as a rubberized chain 18 (shown in phantom in FIG. 1) preferably links each of the flaps for simultaneous, similar movement. An appropriate chain securing means 20 may be provided, for example on top border 12, to permit the user to secure the flaps in an appropriately predetermined open orientation as desired (FIG. 2).

Flaps 16 may extend from top border 12 to the bottom of spray shield 2, or alternatively a solid area 21 may be provided on the shield, for example, to carry a manufacturer's trade mark or the like, with the flaps 16 making up most of the rest of the area of the shield.

Along top border 12 (as illustrated) and side borders 14 (not illustrated) is preferably provided a reinforcing means such as a strip 22, preferably made of metal.

Extending along side borders 14, extending outwardly along each and angled with respect to front surface 8 are deflection surfaces 26 and 28. As can be seen in FIG. 2, deflection surface 26 is angled outwardly and forwardly while deflection surface 28 is angled outwardly and rearwardly with respect to the front surface 8. In this manner, air and spray deflected by the wheels 4 toward front surface 8 will be deflected not only downwardly by flaps 16, but also from left to right, in FIG. 2, as a result of the deflection surfaces 26 and 28. This would be an appropriate construction for a spray shield 2 for the passenger side of a vehicle where the driver sits on the left side. Of course, by appropriate selection of the angles of deflection surfaces 26 and 28, the lateral direction of air and spray may be controlled. Thus, in the wheel set schematically illustrated in FIG. 3, the lateral direction of spray from the wheels produced by spray shields 2 illustrated in full line would be from left to right. Alternatively, by angling the deflection surfaces, 26 and 28 oppositely in FIG. 3, so that the one which is forwardly angled became rearwardly angled, and vice versa (not illustrated), the lateral direction of the spray would be from right to left. Similarly, it would be obvious to one skilled in the art that deflection surfaces 26 and 28 on spray shields 2 could be arranged to laterally direct spray from the wheels towards the centre part of the vehicle.

In an alternative embodiment of the invention illustrated in phantom in FIG. 3, a single spray shield 2a of the construction described above may extend transversely across the vehicle behind all of the wheels 4 (preferably the rear wheels), to approximately direct the spray. In this case, by way of illustration, deflection surfaces 26 and 28 have been angled to deflect spray towards the centre of the vehicle.

Finally, as illustrated in FIGURE 1a, a replacement flap 16a may be provided to take the place of a regular flap 16 which has broken away. Replacement flap 16a would, for example, have a projection 30 on each side, towards the top, which would fit in an appropriately placed hole (not illustrated) on the inner surface of each of the side borders 14.

The spray shield according to the present invention provides many advantages over known prior art devices. In addition to providing minimal air resistance because of the openings provided by the flaps, and the downward deflection of air and spray as a result of these flaps, there is also a simultaneous direction of air and spray to a predetermined side of the spray shields, thereby providing significantly more control over the direction and disposition of spray thrown up by the vehicles' wheels. The shield provides for minimal build up of dirt which, on many of prior art spray shields providing a screen or solid surface, becomes a significant problem to the efficient operation of such prior art devices. The spray shield of the present invention is also extremely simple to manufacture, it being possible to stamp most of the shield from an appropriate sheet of rubber or plastic.

Thus there has been provided in accordance with the invention a spray shield for automotive vehicles that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

What I claim as my invention:

1. A spray shield for a wheel of an automotive vehicle for controlling the spray generated thereby when travelling on a roadway surface, the shield being in sheet form and having front and rear surfaces and top and side borders, and adapted to be disposed above the roadway surface vertically depending from the vehicle and spaced rearwardly from the vehicle wheel in a plane extending transversely to the vehicle, a plurality of vertically aligned, downwardly depending, contiguous flaps, each flap extending horizontally between the side borders when the shield is in position on the vehicle, the flaps to permit flow of air and spray through the shield and cause downward deflection thereof, and a pair of air deflection surfaces to be vertically oriented during operation, one extending outwardly along each of the borders and each angled with respect to the front surface of the spray shield to deflect air and spray laterally, from the side of the spray shield normally positioned adjacent the center of the roadway towards the side of the spray shield opposite thereto, wherein the air deflection surface along the border of the shield adjacent the center of the roadway is angled forwardly and outwardly with respect to the front surface of the shield and the other air deflection surface is angled outwardly and rearwardly with respect thereto.

2. A spray shield according to claim 1 wherein the flaps extend from the top border to the bottom of the shield.

3. A shield according to claim 1 wherein link means are provided joining each of the flaps for simultaneous and similar movement, and wherein a securing means is provided for the link means so that the flaps may be held in a position lifted a predetermined degree for free flow of air through the shield.

4. A shield according to claim 1 wherein the borders and flaps are made from a sheet of flexible material, the flaps being formed by appropriately cutting such sheet material.

5. A shield according to claim 4 in which the sheet material is heavy-duty rubber.

6. A shield according to claim 4 in which the borders are metal-reinforced.

7. A spray controlling system for automobile vehicles including in combination,
 a vehicle having a wheel set and a body structure associated therewith; and
 a plurality of spray shields according to claim 1 downwardly depending from the body structure of the vehicle each of the spray shields being associated with one or more wheels of the vehicle wheel set and spaced rearwardly therefrom, the air deflection surfaces of the spray shields being angled to deflect air to a predetermined side of the spray shield.

8. A spray controlling system for automobile vehicles including in combination,
 a vehicle having a wheel set and a body structure associated therewith; and
 a plurality of spray shields according to claim 1 downwardly depending from the body structure of the vehicle each of the spray shields being associated with one or more wheels of the vehicle wheel set and spaced rearwardly therefrom, the air deflection surfaces of each spray shield being angled to deflect air laterally to the same side of the vehicle.

9. A spray controlling system for automobile vehicles including in combination,
 a vehicle having wheel sets mounted on two or more axles and a body structure associated therewith;
 a spray shield according to claim 1 downwardly depending from the body structure of the vehicle and extending transversely across the vehicle behind the wheels of an axle, the spray shield being spaced rearwardly from the wheels of that axle.

* * * * *